US011745345B2

(12) United States Patent
Dupuis et al.

(10) Patent No.: US 11,745,345 B2
(45) Date of Patent: Sep. 5, 2023

(54) PLANNING BY WORK VOLUMES TO AVOID CONFLICTS

(71) Applicant: Intrinsic Innovation LLC, Mountain View, CA (US)

(72) Inventors: Jean-Francois Dupuis, San Francisco, CA (US); Keegan Go, Mountain View, CA (US); Stoyan Gaydarov, Burlingame, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 101 days.

(21) Appl. No.: 17/005,060

(22) Filed: Aug. 27, 2020

(65) Prior Publication Data

US 2021/0060779 A1   Mar. 4, 2021

Related U.S. Application Data

(60) Provisional application No. 62/894,615, filed on Aug. 30, 2019.

(51) Int. Cl.
  *B25J 9/16* (2006.01)
  *B25J 9/00* (2006.01)
(52) U.S. Cl.
  CPC .......... *B25J 9/1666* (2013.01); *B25J 9/0084* (2013.01); *B25J 9/1661* (2013.01); *B25J 9/1682* (2013.01); *G05B 2219/39109* (2013.01); *G05B 2219/40417* (2013.01)

(58) Field of Classification Search
  CPC ...... B25J 9/1666; B25J 9/0084; B25J 9/1661; B25J 9/1682; G05B 2219/39109; G05B 2219/40417
  See application file for complete search history.

(56) References Cited

U.S. PATENT DOCUMENTS

| | | |
|---|---|---|
| 9,104,197 B2 | 8/2015 | Miegel et al. |
| 9,915,937 B2 | 3/2018 | Linnell et al. |
| 9,993,824 B2 | 6/2018 | Menges et al. |
| 10,035,266 B1 | 7/2018 | Kroeger |
| 10,296,012 B2 | 5/2019 | Lalonde et al. |
| 11,199,853 B1 * | 12/2021 | Afrouzi ................ G05D 1/0246 |
| 2010/0190926 A1 | 7/2010 | Krishnaswamy et al. |

(Continued)

*Primary Examiner* — Robert T Nguyen
*Assistant Examiner* — Karston G. Evans
(74) *Attorney, Agent, or Firm* — Fish & Richardson P.C.

(57) ABSTRACT

Methods, systems, and apparatus, including computer programs encoded on computer storage media, for planning by work volumes to avoid conflicts. One of the methods includes receiving a process definition graph for a robot that includes action nodes, wherein the action nodes include (1) transition nodes that represent a motion to be taken by the robot from a respective start location to an end location and (2) task nodes that represent a particular task to be performed by the robot at a particular task location. An initial modified process definition graph that ignores one or more conflicts between respective transition nodes as well as one or more conflicts between respective transition nodes and task nodes is generated from the process definition graph. A refined process definition graph that ignores conflicts between transition nodes and recognizes conflicts between transition nodes and task nodes is generated from the initial modified process definition graph.

20 Claims, 9 Drawing Sheets

(56) References Cited

U.S. PATENT DOCUMENTS

| | | | |
|---|---|---|---|
| 2011/0153080 A1* | 6/2011 | Shapiro | B25J 9/1666 |
| | | | 700/255 |
| 2012/0215351 A1* | 8/2012 | McGee | B25J 9/1676 |
| | | | 700/248 |
| 2015/0316925 A1 | 11/2015 | Frisk | |
| 2017/0028559 A1* | 2/2017 | Davidi | B25J 9/1682 |
| 2017/0210008 A1* | 7/2017 | Maeda | B25J 9/1666 |
| 2018/0333847 A1* | 11/2018 | Ma | G05D 1/02 |
| 2019/0086894 A1* | 3/2019 | Tenorth | B25J 9/163 |
| 2020/0125116 A1* | 4/2020 | Wang | B25J 11/0085 |
| 2020/0174460 A1 | 6/2020 | Byrne et al. | |
| 2021/0060777 A1* | 3/2021 | Dupuis | B25J 9/0084 |
| 2021/0078172 A1* | 3/2021 | Cao | G06T 7/579 |

\* cited by examiner

PLANNING BY WORK VOLUMES TO AVOID CONFLICTS

CROSS-REFERENCE TO RELATED APPLICATION

This application claims priority to U.S. Provisional Application No. 62/894,615, filed on Aug. 30, 2019. The disclosure of the prior application is considered part of and is incorporated by reference in the disclosure of this application.

BACKGROUND

This specification relates to robotics, and more particularly to planning robotic movements.

Robotics planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a schedule that is manually generated for one workcell can generally not be used for other workcells. In this specification, a workcell is the physical environment in which a robot will operate. Workcells have particular physical properties, e.g., physical dimensions, that impose constraints on how robots can move within the workcell. Thus, a manually programmed schedule for one workcell may be incompatible with a workcell having different robots, a different number of robots, or different physical dimensions.

In many industrial robotics applications, the primary success or failure criteria of a schedule is the time it takes to complete a task. For example, at a welding station in a car assembly line, the time it takes for robots to complete welds on each car is a critical aspect of overall throughput of the factory. When using manual programming, it is often difficult or impossible to predict how long the resulting schedule will take to complete the task.

Workcells often contain more than one robot. For example, a workcell can have multiple robots each welding a different car part onto the frame of a car at the same time. In these cases, the planning process can include assigning tasks to specific robots and planning all the movements of each of the robots. Manually programming these movements in a way that avoids collisions between the robots while minimizing the time to complete the tasks is difficult, as the search space in a 6D coordinate system is very large and cannot be searched exhaustively in a reasonable amount of time.

SUMMARY

This specification describes how a system can generate a schedule for one or more robots using an underconstrained process definition graph. In general the system can iteratively apply transformers in order to repeatedly transform the process definition graph until a schedule satisfying one or more goal criteria is reached. As part of this iterative process, the system can first relax certain constraints required for the final process definition graph in order to produce an initial modified process definition graph that may not satisfy the relaxed constraints. The system can then reintroduce some of the relaxed constraints to produce a refined process definition graph that satisfies the reintroduced constraints but may not satisfy the relaxed constraints that were not reintroduced. The system can repeat this process more than once until it produces a final process definition graph that represents a final schedule that satisfies all goal criteria.

For example, the system can first produce an initial modified process definition graph that allows for collisions between a first robot executing a first task and a second robot moving within the workcell to position itself to begin a second task. The system can then produce a refined process definition graph that avoids all such collisions, but still allows for collisions between two robots that are both moving within the workcell to position themselves to begin respective tasks. Finally, the system can produce a final process definition graph that avoids all collisions between all robots.

In order to avoid collisions between a first robot executing a task and second robot moving within a workcell, for example, the system can first generate a work volume for the first robot characterizing the space occupied by the first robot during the execution of the task. The system can then generate a path for the second robot that avoids the work volume of the first robot, thereby ensuring that the first and second robots do not collide.

Particular embodiments of the subject matter described in this specification can be implemented so as to realize one or more of the following advantages.

Using transformers to iteratively manipulate a process definition graph to generate a robotics schedule dramatically reduces the amount of manual programming required in order to program robots. The system can generate a fully constrained schedule for an arbitrary number of robots from an initial underconstrained process definition graph. Using a process definition graph makes specifying robot actions more flexible, faster, and less error-prone. In addition, the techniques described below allow for exploring a much larger search space than what could be achieved by mere manual programming. Therefore, the resulting schedules are likely to be faster and more efficient than manually programmed schedules.

When a system generates a robotics schedule using a process definition graph, the system can guarantee that the process definition graph is always in a usable state even if the graph currently contains errors. That is, the system can track each step that the system took to arrive at the current state of the graph, maintaining a full history of the graph, allowing the system to debug the errors in the graph much more efficiently. In addition, because each transform applied to the process definition graph is independent and can be back-tracked, the system can experiment with different transformation pipelines without risk to the integrity of the final graph.

Furthermore, the system can reuse the set of transformers multiple times and in different ways. For example, the system can compose, from the same set of transformers, different sequences of particular transformers to generate robotics schedules for different tasks. The composed sequence of particular transformers for generating a robotics schedule for a particular task or set of tasks can depend on multiple factors, e.g., the requirements of the particular task or set of tasks, the robotic operating environment in which the robotics schedule will be executed, etc. Furthermore, this composability framework allows each transformer in the set of transformers to be reused and tested in a straightforward manner.

Initially relaxing constraints to produce an initial plan is computationally advantageous. In the first iteration, the system is able to generate a sequence of tasks and assign them to respective robots without overengineering the initial plan to avoid potential collisions. It is inefficient to fully solve the plan for all collisions at such an early stage, as the plan is very likely to be changed later in the process. Some of the motions of the robots are likely to be modified, added, or eliminated, and so the work of ensuring that these motions avoid collisions is wasted.

After generating the initial plan, the system has a rough sketch of what each robot will be doing, as each task is assigned to a specific robot at a specific time. With this information, the system can reintroduce constraints and define more precise motions to avoid collisions. There are many possible paths a first robot can take between a start point and an end point, and so it is beneficial for the system to have a rough sketch of what all the robots are doing in the workcell when the first robot is moving in order to decide which path the first robot should take to avoid collisions.

This specification refers to generating a robotics schedule for robots to accomplish one or more tasks. However, generally the same techniques can be applied to generating a plan for any device to accomplish one or more tasks to be performed on a schedule in an initially underconstrained problem space. For example, using techniques described in this specification, a system can generate, from an initially underconstrained graph, a plan to emit a sequence of sounds.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
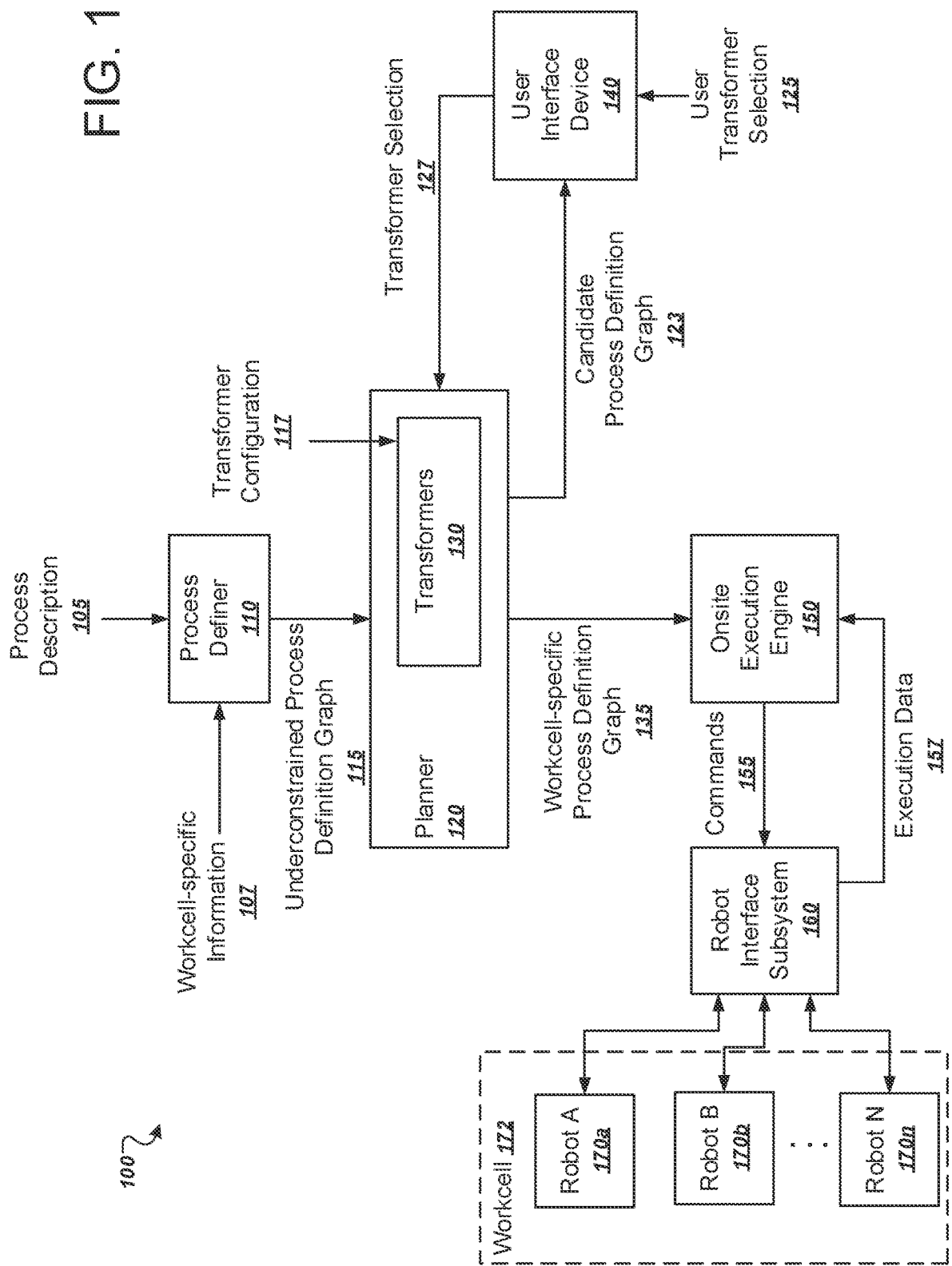
FIG. 1 is a diagram that illustrates an example system.

FIG. 1 is a diagram that illustrates an example system 100. The system 100 is an example of a system that can implement the techniques described in this specification.

The system 100 includes a number of functional components, including a process definer 110, a planner 120, a collection of transformers 130, a user interface device 140, an onsite execution engine 150, and a robot interface subsystem 160. Each of these components can be implemented as computer programs installed on one or more computers in one or more locations that are coupled to each other through any appropriate communications network, e.g., an intranet or the Internet, or combination of networks.

The system 100 also includes a workcell 172 that includes N robots 170a-n. The overall goal of the planner 120 and other components of the system 100 is to generate, from the underconstrained process definition graph 115, a schedule that will be executed by the robots 170a-n to accomplish one or more tasks. The resulting schedule can be represented in a variety of ways and may be represented as a near-fully constrained or a fully constrained process definition graph, e.g., the workcell-specific process definition graph 135. As mentioned above, a common goal metric for such schedules is elapsed time, and thus the planner 120 can aim to generate a schedule that causes the robots 170a-n to accomplish the one or more tasks in the shortest possible amount of time.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more movable components of the robot. Example tools include grippers, welding devices, and sanding devices. That is, a robot can include one or more tools.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing an action, which can be a task, a cluster of tasks, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a task graph between two configuration states for a single robot. Thus, generally there is one task graph per robot. In some implementation, a motion plan can include instructions for the robot to "rest," i.e., to stay in the current position.

In this specification, a motion swept volume is a region of the space that is occupied by a least a portion of a robot or tool during the entire execution of a motion plan. The motion swept volume can be generated by collision geometry associated with the robot-tool system.

In this specification, a transition is a motion plan that describes a movement to be performed between a start point and an end point. The start point and end point can be represented by poses, locations in a coordinate system, or tasks to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

In this specification, a schedule is data that assigns each task to at least one robot. A schedule also specifies, for each robot, a sequence of actions to be performed by the robot. A schedule also includes dependency information, which specifies which actions must not commence until another action is finished. A schedule can specify start times for actions, end times for actions, or both.

To initiate schedule generation, a user can provide a process description 105 and workcell-specific information 107 to a process definer 110. The process description 105 can include a high-level description of the tasks to be completed. The workcell-specific information 107 can include data that represents properties of the workcell, including physical dimensions, the locations and dimensions of obstacles or other hardware in the workcell, or the type and number of robots 170a-n in the workcell.

From the process description 105 and the workcell-specific information, the process definer 110 can generate an underconstrained process definition graph 115. Alternatively or in addition, a user can provide the underconstrained process definition graph 115 to the planner 120. In this specification, a process definition graph, or for brevity, a graph, is a directed acyclic graph having constraint nodes and action nodes.

Action nodes represent actions for a robot to perform, which can include nodes representing tasks or clusters of tasks, e.g., as specified in the original process description. Action nodes can also represent transitions that robots can perform, e.g., transitions between tasks or other locations in the workcell.

Constraint nodes represent particular relationships between children nodes that must be preserved in any schedule. In general, constraint nodes can represent existence constraints or time constraints. An existence constraint specifies a constraint on which children can be selected. A time constraint specifies a constraint on the timing among children. For example, a constraint node can have as children two action nodes, and the constraint node can represent a time constraint that a first action represented by a first of the two action nodes must start before a second action represented by a second of the two action nodes.

Being an underconstrained process definition graph means that the graph lacks various kinds of information required to actually drive the robots 170a-n to accomplish the tasks. The graph can be underconstrained in a variety of ways. For example, the graph can lack any sense of time, scheduling, or ordering between tasks. Being underconstrained can also mean that various properties of task nodes are partially defined or undefined.

Thus, in some implementations the planner 120 can receive a process definition graph 115 having nodes representing the tasks to be performed as specified by the process description, but without specifying any ordering between the tasks, without specifying any assignment of any of the robots 170a-n to any of the tasks, and without specifying what movements the robots should undertake in order to prepare to perform the tasks.

The planner 120 can then perform an iterative process to begin solving constraints in the underconstrained process definition graph 115. The final output of this process is data representing a schedule, which can be a workcell-specific process definition graph 135, which, for brevity may also be referred to as a final schedule. The workcell-specific process definition graph 135 contains enough information to drive the robots 170a-n to complete the one or more tasks specified in the original underconstrained process definition graph 115. Thus, the workcell-specific process definition graph 135 will generally specify which robots will be performing which tasks. The workcell-specific process definition graph 135 can also specify the timing, scheduling, ordering and movement actions to be taken by each robot between tasks. Additionally, the movements specified by the workcell-specific process definition graph 135 can take into account the physical attributes and obstacles of the workcell 172.

The onsite execution engine 150 receives the workcell-specific process definition graph 135 and issues commands 155 to the robot interface system 160 in order to actually drive the movements components, e.g., the joints, of the robots 170a-n. In some implementations, the robot interface subsystem 160 provides a hardware-agnostic interface so that the commands 155 issued by onsite execution engine 150 are compatible with multiple different versions of robots. During execution the robot interface subsystem 160 can report execution data 157 back to the onsite execution engine 150 so that the onsite execution engine 150 can make real-time or near real-time adjustments to the robot movements, e.g., due to local faults or other unanticipated conditions.

In execution, the robots 170a-n generally continually execute the commands specified explicitly or implicitly by the motion plans to perform the various tasks or transitions of the schedule. The robots can be real-time robots, which means that the robots are programmed to continually execute their commands according to a highly constrained timeline. For example, each robot can expect a command from the robot interface subsystem 160 at a particular frequency, e.g., 100 Hz or 1 kHz. If the robot does not receive a command that is expected, the robot can enter a fault mode and stop operating.

In some implementations, the planner 120 and the process definer 110 are cloudbased systems that are physically removed from a facility that physically houses the workcell 172, while the onsite execution engine 150 is local to the facility that physically houses the workcell 150. This arrangement allows the planner 120 to use massive cloud-based computing resources to consider many possibilities for robot schedules, while also allowing for real-time reaction to unanticipated events by the onsite execution engine 150.

As stated above, the planner 120 can generate a workcell-specific process definition graph 135 from the initial underconstrained process definition graph 115. To do so, the planner 120 can repeatedly apply a number of transformers from a collection of transformers 130. Each transformer is a stateless function that takes as input an underconstrained process definition graph and resolves variables in the underconstrained process definition graph. As part of this process, a transformer can modify action nodes, constraint nodes, or both, by adding, modifying, or deleting these nodes, and generates as output a modified process definition graph. This process is described in more detail below with reference to FIG. 2.

The transformers to be used can also be specified by a user as a transformer configuration 117. In other words, the user can specify which of the collection of transformers 130 are to be used when iteratively modifying the initial underconstrained process definition graph 115.

The planner 120 can also optionally invite users to make transformer selections while generating a final schedule. In other words, the planner 120 can provide a candidate process definition graph 123 to a user interface device 140. The user interface device 140 can then present a user interface that allows a user to input a user transformer selection 125, which directs the planner 120 to perform the next iteration using a transformer selection 127 specified by the user. This interactive process can allow the planner 120 to take into consideration constraints and other real-world considerations that were not or could not be specified as part of the original process description.

Figure 2:
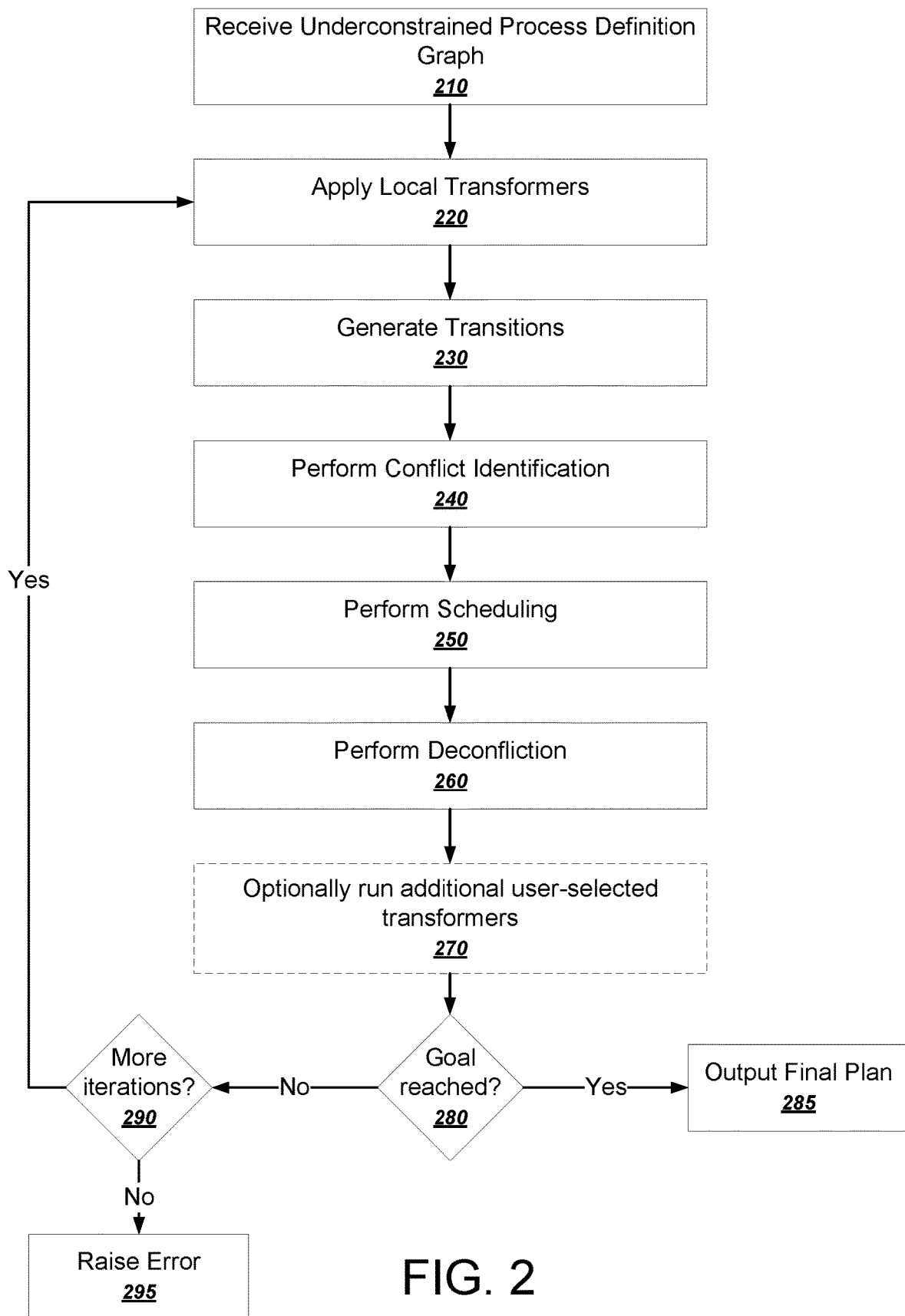
FIG. 2 is a flowchart of an example process for iteratively applying transformers to generate a final process definition graph.

FIG. 2 is a flowchart of an example process for iteratively applying transformers to generate a final process definition graph. The process can be implemented by one or more computer programs installed on one or more computers in one or more locations and programmed in accordance with this specification. For example, the process can be performed by the planner 120 shown in FIG. 1. For convenience, the process will be described as being performed by a system of one or more computers.

The system receives an underconstrained process definition graph (210). As described above, a process definition graph is a directed acyclic graph that can include at least two different types of nodes, constraint nodes and action nodes.

Figure 3:
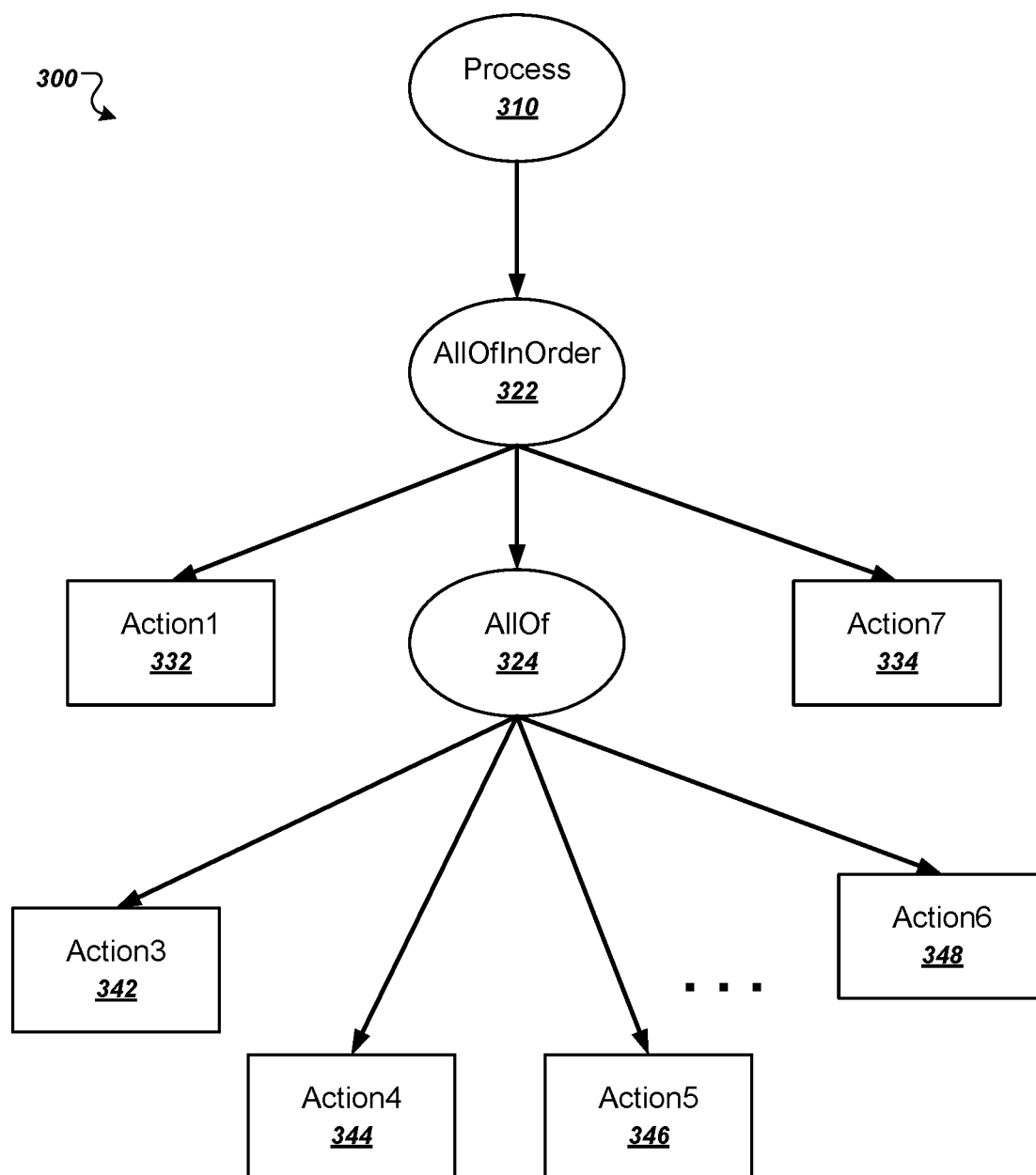
FIG. 3 illustrates an example underconstrained process definition graph.

FIG. 3 illustrates an example underconstrained process definition graph 300. The graph includes a root node 310, two constraint nodes 322 and 324, and six action nodes 332, 334, 342, 344, 346, and 348.

Each of the action nodes represents one or more physical actions to be performed by a particular robot. For example, an action node can represent an action to move a robot arm, apply a weld, open a gripper, close a gripper, or any other appropriate action that can be performed by a robot. Action nodes can also be composite actions that include multiple other actions. For example, a PickAndPlace composite action can include a pick action and a separate place action.

Notably, the action nodes need not specify which robot in a workcell will perform each action. The action nodes can be partially defined by specifying some values, e.g., a duration or a location for each action. The action nodes can also be partially defined by specifying options, e.g., a list or a range of acceptable durations.

The AllOfInOrder constraint node 322 specifies that its children nodes have to be performed in a particular order. In other words, the constraint node 322 introduces a constraint that Action 1, represented by the action node 332, has to occur before any of the other actions, and that Action 7, represented by the action node 334, has to occur after any of the other actions.

The AllOf constraint node 324 specifies simply that all of its children have to be performed, but does not specify an ordering. Thus, through the iterative planning process, the planner is free to schedule Actions 3-6 in any appropriate order that does not violate any other constraints in the graph.

One concrete example of an application that might use a graph similar to the graph 300 is welding a part in a factory. For example, the initial action node 332 can represent an action that moves the part into place, and the final action node 334 can represent an action to move the part to its destination. Those are examples of actions that have to happen first and last, as specified by the AllOfInOrder constraint node 322.

Actions 3-6 can be welding actions for 4 separate weld points on the part. For most welding applications, the order does not matter. Thus, while the AllOf constraint node 324 imposes a constraint that all welds have to be performed, the AllOf constraint node 324 does not impose any constraints on the ordering in which the welds must be performed.

Instead, the planner will use various transformers in order to search the space of schedules that satisfy the constraints imposed by the final graph and choose a schedule that is best according to a particular objective function. For example, the planner can simply search the space of schedules that satisfy the constraints and identify which schedule executes all the actions the fastest.

TABLE 1 lists some common constraint node types.

TABLE 1

| Constraint Node Name | Constraint |
| --- | --- |
| AllOf | All children must be performed |
| AnyOf | Any children can be performed |
| OneOf | Exactly one child must be performed |
| InOrder | Children must be performed in an order specified by the representation in the graph |
| DirectlyInOrder | Children must be performed in an order specified by the representation in the graph, without any intervening actions |
| MustOccurDuring | Child must be performed during a specified time period |
| MustNotOccurDuring | Child must not be performed during a specific time period |
| Conflict | Children cannot occur at overlapping times |
| Cluster | All children must be performed by the same robot |
| If | If one child occurs, the subsequent child must happen after it |

A constraint node can combine multiple constraint node types. For example, in this notation, the AllOfInOrder node had a name that specified two constraint types, both the AllOf constraint type as well as the InOrder constraint type.

As shown in FIG. 2, the system applies local transformers (220). As described above, each transformer is a function that further constrains the process definition by assigning values to variables or manipulating or expanding nodes in the graph.

In general a system can apply a transformer by matching certain patterns associated with nodes in the graph. As one example, applying a transformer can include looking for underconstrained properties in the graph and assigning values to those properties. As another example, a transformer can have one or more defined node types as input and the system can determine that the transformer is a match for the node types when a matching arrangement of nodes found in the graph.

The system can distinguish between local transformers and global transformers and apply local transformers first. A local transformer is a transformer that does not require reconsideration of all nodes in the graph and which affects only a sufficiently small subset of the graph. The system can use any appropriate definition for what is a sufficiently small subset of the graph, e.g., only transformers that affect their direct children or nodes not more than N links away. As a particular example, a local transformer can be applied to a single node in the graph.

An example of a global transformer is a "clustering" transformer, which takes consideration all tasks in the graph that change the position of one or more robots, and proposes ordering constraints that ensure that the robots move efficiently between tasks (for example, avoiding doubling back by robots where possible).

The system can apply local transformers first in order to quickly generate many additional constraints in the graph. For example, if an action node has a particular pose, the system can apply an inverse kinematics (IK) transformer that will generate the kinematic parameters for achieving the pose. Thus, for a given pose, the system can consider an IK transformer to be a local transformer because the transformer affects only a single action node.

The system generates transitions (230). Transitions are actions taken by robots to move from one configuration to another. For example, if two tasks are to be performed by a robot in sequence, the system can generate a transition between the tasks by determining how the robot can move from a final pose for a first task to a starting pose for a second task. In some implementations, the system implements transition generators as transformers that seek to match on two action nodes in sequence that so far have no assigned intermediate transition. For example, a transition can be represented by a transition node between two respective task nodes in the graph.

Some transformers are designed to generate many alternative options that can all be considered when performing scheduling. For example, when generating transitions, the system can generate multiple different ways of moving from one action to another. The system can represent each generated alternative transition as a separate node in the graph. Since only one transition is needed, the system can constrain the alternatives with an appropriate OneOf constraint node.

Figure 4A:
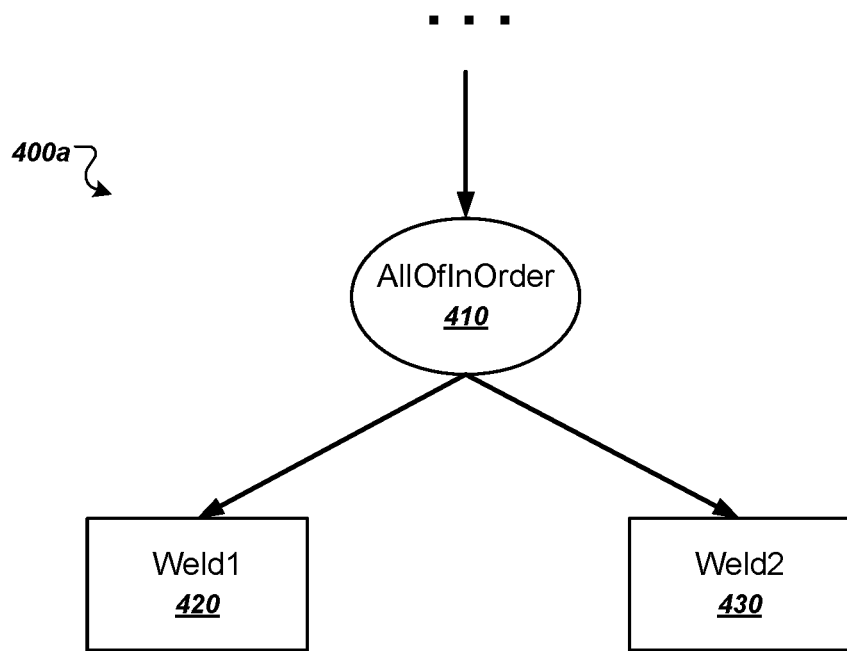
FIGS. 4A-B illustrate generating transitions for a portion of a process definition graph.
Figure 4B:
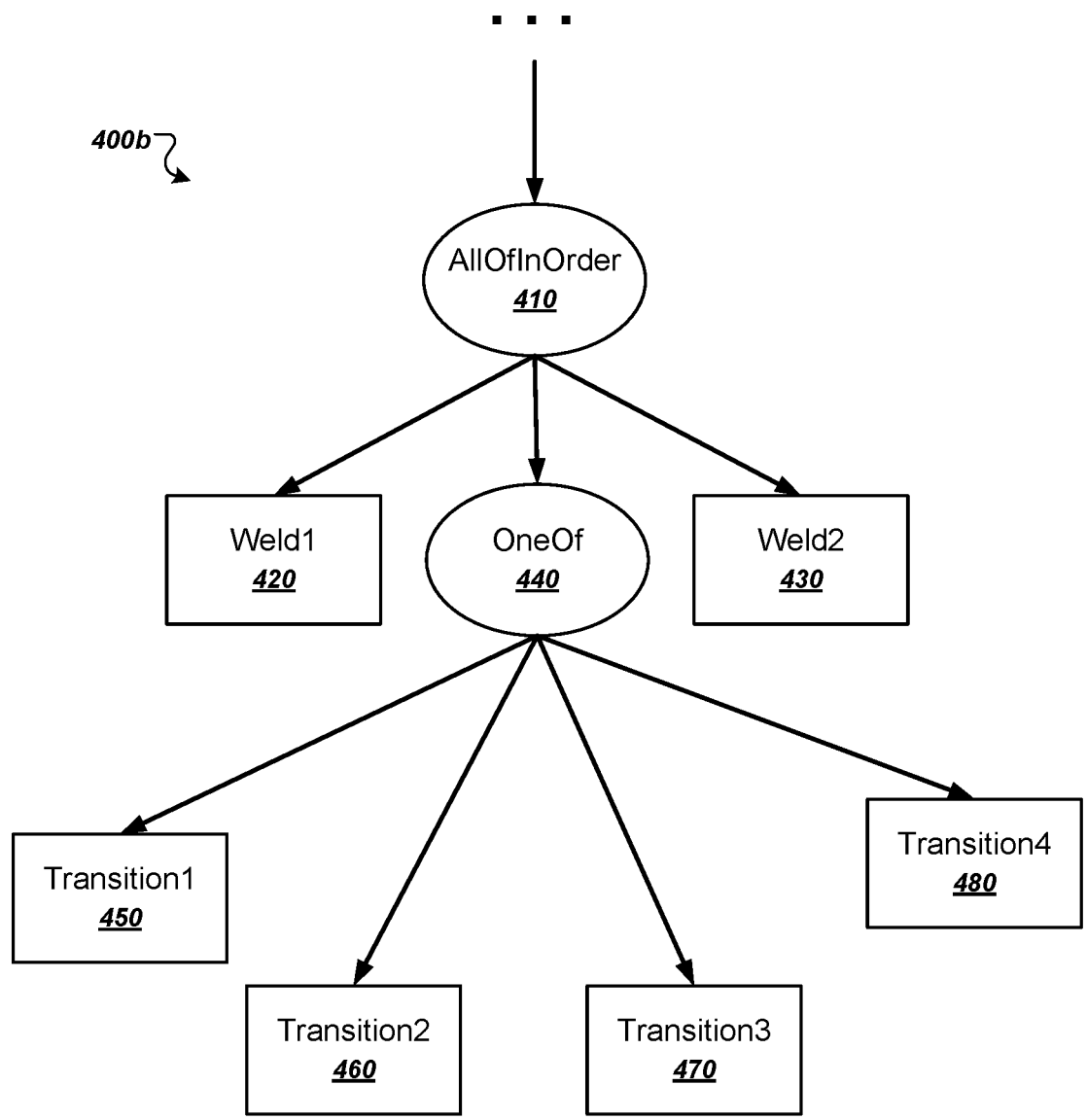

FIGS. 4A-B illustrate generating transitions for a portion 400a of a process definition graph. In FIG. 4A, an AllOfInOrder constraint node 410 represents that a welding action represented by a task node 420 should be performed before a welding action represented by another task node 430. In some implementations, during transition generation the system searches the graph for gaps between sequenced actions that lack transitions. Thus, the system can identify the portion 400a as a portion of the graph having two sequenced actions but lacking a transition between them.

FIG. 4B illustrates a modified portion 400b of the process definition graph after transition generation. As shown, the system generated four alternative transitions for transitioning between the task node 420 and the task node 430. Each alternative transition is represented by its own action node, e.g., the transition nodes 450, 460, 470, and 480. The transition nodes 450-480 are constrained by a OneOf constraint node 440 that represents that the system should execute one and only one of the generated alternative transitions.

This example illustrates how transformers can add additional constraints to the graph in the form of alternatives rather than selections. In other words, the transformers seek to increase the space of possible alternative schedules rather than attempting to solve the constraints of the schedule in one pass.

Therefore, after the system performs transition generation, the process definition graph typically has many more nodes that it previously did, with each added node representing a possible transition between actions.

As shown in FIG. 2, the system performs conflict identification (240). In other words, the system identifies actions in the graph that cannot occur at the same time, the same space, or both. For example, the system can generate a volume for each action node in the graph characterizing the space occupied by the robot performing the respective action, and identify which actions are potentially conflicting. For example, the system can generate a first volume characterizing the space occupied by a first robot and a second volume characterizing the space occupied by a second robot. The two robots can be considered to have a conflict when the first and second volumes intersect.

Notably, the system can perform the conflict identification process before scheduling occurs. The system can then perform a deconfliction process after scheduling occurs. In other words, the system identifies conflicts before scheduling, but need not strive to avoid conflicts during scheduling.

In some implementations, the system identifies certain types of conflicts that it will strive to avoid during scheduling, and other types of conflicts that it will ignore during scheduling. For example, the system might designate three types of conflict, among others. A first type of conflict can characterizes collisions between two robots that are each executing a respective task. A second type of conflict can characterize collisions between a first robot executing a task and a second robot moving within the workcell between executing tasks. A third type of conflict can characterize collisions between two robots that are each moving within the workcell between executing tasks. In some implementations, the system strives to avoid conflicts of the first type, while not striving to avoid conflicts of the second and third types. In these implementations, the system can wait to solve for the second and third types of conflict during the deconfliction step (260).

The system performs scheduling (250). The output of the scheduling process is an initial modified process definition graph. As described above, a schedule specifies one robot to perform each task, and for each robot, a sequence of actions to be performed. A schedule can also specify a start time for each action and dependencies between actions.

For example, to perform scheduling, the system can receive as input a set of possible graphs, e.g., a set of every possible alternative graph that can be generated from the graph and that accomplishes the required tasks. The system can process the set of possible graphs to generate an output that is a selection of action nodes to execute as well as dependencies (i.e., a selection of constraint nodes) that specify requirements of the schedule. That is, the output of the scheduling process can be an updated graph, generated from the original graph, with extra constraints that remove the uncertainties of the original graph.

As a particular example, referring to the example depicted in FIG. 4B, the output of the scheduling process might be a graph that includes an AllOfInOrder node with three child nodes 420, 460, and 430. That is, the system selected the second transition 460 from the set of possible transitions 450, 460, 470, and 480, removing the uncertainty of the OneOf node 440.

As another particular example, there may be a situation where two robots need to cross each other, the system can identify (e.g., during conflict identification) the constraint that the two robots cannot collide when crossing each other. The output of the scheduling process can therefore include a scheduling constraint that ensures that the two robots do not perform the movement at the same time, for example, by generating a dependency between the completion of the first movement and the beginning of the second movement (e.g., using an InOrder node or a MustNotOccurDuring node).

In some implementations the system generates the initial modified process definition graph by ignoring some constraints. For example, the system can ignore one or more conflicts between respective transition nodes as well as one or more conflicts between respective transition nodes and task nodes.

In general, the scheduling process solves for underconstrained values in the graph until either no more values need to be solved or the system determines that no solution can be found.

In general, the system can use a variety of solvers to determine that no more constraints need to be solved. For example, the system can use a circuit solver to determine when sequenced starting and ending points have no gaps in between. If gaps remain, the system can use transition generation to fill the gaps or raise an error if no solution exists.

The system can also insert rests into the actions and adjust the values of the rests in order to find a scheduling solution. For example, one perhaps not ideal schedule is that a robot can perform an action and then wait for all other robots to finish their tasks before doing anything else. But by using rests, the system increases the chances that a scheduling solution can be found.

As part of the scheduling process, the system can assign tasks to individual robots in the workcell. Thus, at the end of the scheduling process, the system can generate a visual representation of which tasks are performed by which robots and when.

Figure 5:
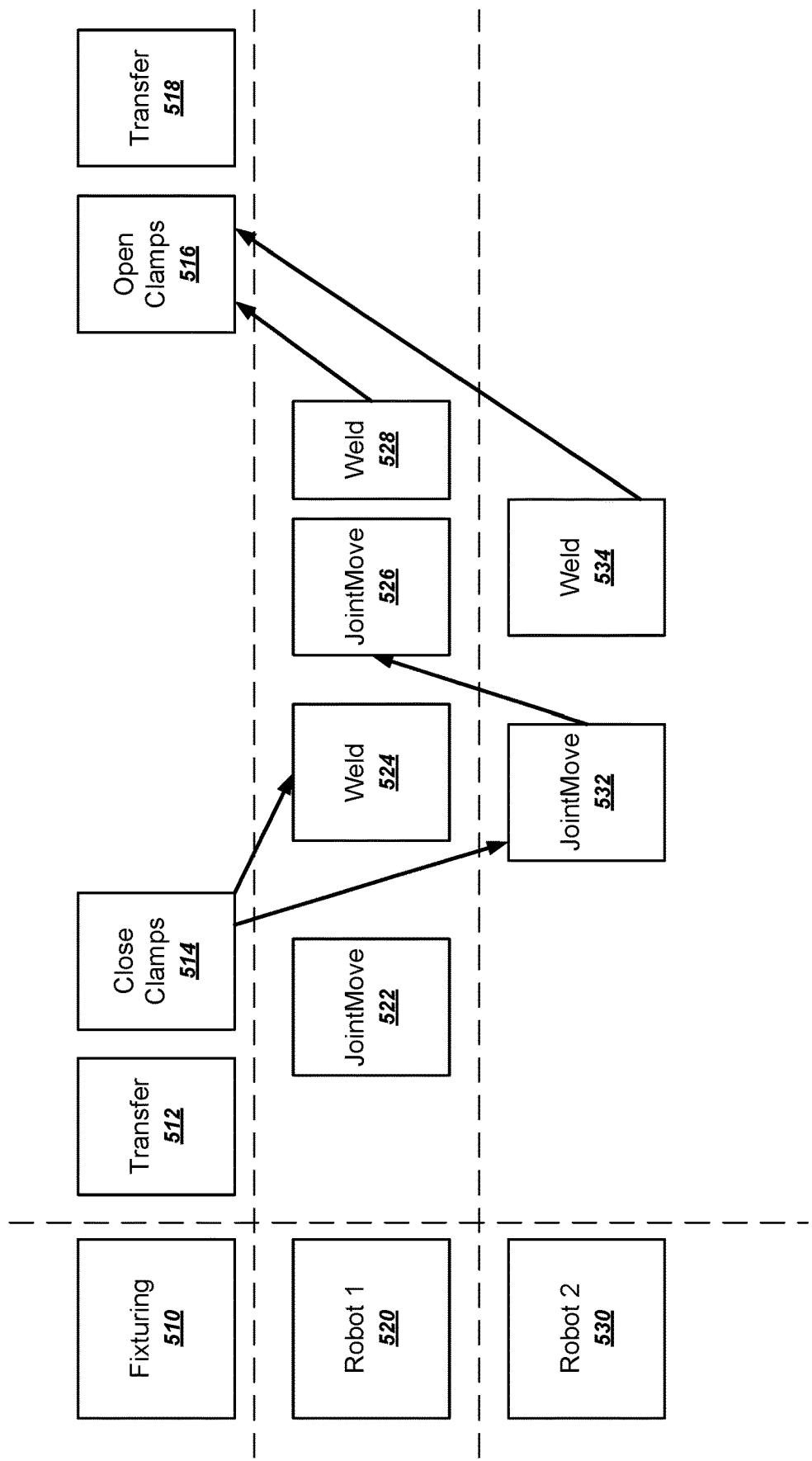
FIG. 5 is a visual illustration of a schedule.

FIG. 5 is a visual illustration of a schedule. The information illustrated in FIG. 5 can still be represented as a process definition graph. And in fact, the deconfliction process that occurs after scheduling can operate on the initial modified process definition graph generated by the scheduling process. However, the visualization shown in FIG. 5 is useful for understanding the constraints encoded into the graph.

In FIG. 5, three robotic components in a workcell have been assigned to perform a variety of tasks. Time generally moves from left to right in FIG. 5, and the arrows represent time ordered constraints between actions by different robotic components. For actions performed by the same robotic component, the ordering of the actions implies a time ordered constraint.

Thus, the example schedule illustrated in FIG. 5 first has the fixturing 510 of the workcell perform a part transfer 512 and then a close clamps action 514. For example, the close clamps action 514 can represent clamps closing down on the part to secure it for welding.

At some time after the transfer 512 starts, the first robot 520 performs a joint move 522 to get into position for welding. However, the action weld action 524 cannot happen until the actual clamps are closed, as illustrated by the arrow from the closed clamps action 514 to the weld action 524.

At some time after the clamps are closed, a second robot 530 performs a joint move 532 to get into position for a weld 534. The joint move 532 also has a constraint that it has to happen after the clamps are closed by the close clamps action 514.

The first robot 520 can then perform a second joint move 526 to get into position for the second weld 528, but not until the second robot has finished its joint move 532, as represented by the arrow from the joint move 532 to the joint move 526. The first robot can then perform the second weld 528.

Finally, the fixturing 510 can open the clamps with an open clamps action 516, but not until both welds 528 and 534 are completed. The fixturing 510 can then perform a transfer action 518 to move the part along in an assembly line.

As shown in FIG. 2, the system performs deconfliction (260). In general, the deconfliction process also applies transformers on the initial modified process definition graph it receives as input, aiming to solve the remaining conflicts in the schedule. The deconfliction process can iteratively apply these transformers to produce refined process definition graphs with more and more conflicts resolved, until it outputs a candidate final process definition graph. As described above, although conflicts may have been identified before scheduling, the scheduler was not necessarily bound by such conflicts during scheduling. In general, generating an initial solution using an underconstrained graph that ignores some conflicts provides computational advantages over trying to solve all constraints and all possible conflicts in one pass. The deconfliction process is described in more detail below in reference to FIG. 6.

The system optionally runs additional user-selected transformers (270). As described above, the system can provide a user interface that seamlessly allows some human design in the process. In particular, the system can present a user interface that allows a user to manually specify a next transformer to be applied in the graph or some other manipulation of the graph. As part of this user interface, the system can also present a graphical simulation of the robots executing a particular candidate schedule. For example, if a particular transition between actions seems too awkward or otherwise not ideal, a human can manually select a different transition. As another example, humans tend to be better at performing geometric or spatial groupings. Thus, a human may want to impose a Cluster constraint node for a particular group of actions that are close together in space, time, or both.

The system determines whether a goal has been reached (280). The system can use a goal solver to determine whether a candidate final process definition graph meets various goal criteria. As mentioned above, total time is often a critical goal criterion. Each action in the schedule can be associated with a respective duration, and then the system can use the respective durations to determine whether a schedule exists that meets the goal criteria. The system can also use other goal criteria, e.g., power used, or some combined score of multiple goal criteria.

If the goal is reached (280), the system outputs the final schedule (branch to 285). For example, the final schedule can then be provided to an onsite execution engine for execution by robots in a workcell.

If the goal is not reached, the system determines whether to perform more iterations (290). In some implementations, the system automatically performs another iteration as long as the system has not determined that a solution is not possible. The system can alternatively or in addition perform an additional iteration only if a maximum number of iterations has not been reached.

If no more iterations are to be performed and the goal has not been reached, the system can raise an error (branch to 295). At that point, the users can determine whether to modify the original process definition in order to try to find a valid solution with different inputs.

In some implementations, as depicted in FIG. 2, if more iterations are to be performed, the system returns to step 220 and reapplies local transformers. In some other implementations, the system can return to step 240 to perform another round of conflict identification. That is, the system might not need to reapply the local transformers or to generate transitions again.

One of the advantages of representing all phases of the planning process as a process definition graph is that the history of the process is represented explicitly. The output of every transformer and every phase is saved, so that every intermediate process definition graph is available. The state of the schedule as it evolved over the iterations is therefore available. This allows changes to be easily undone and the schedule's modifications rewound in time and tried again with different transformers or parameters. This also makes debugging the schedules much easier because it becomes clear how the schedule got to where it is and by which transformers.

In some implementations, the system can perform the process depicted in FIG. 2 multiple times to generate multiple different candidate schedules. For example, the system might perform the process multiple times in parallel, e.g., by selecting different sequences of transformations to generate the different candidate schedules. The system can then select the final schedule from the set of candidate schedules according to one or more criteria, e.g., a time to complete the one or more required tasks, a measure of efficiency, a measure of safety, etc. That is, the system can search the space of possible schedules by evaluating different transformation sequences. As a particular example, the system might evaluate a particular sequence of transformation sequences and determine to "backtrack" to a particular transformation in the sequence and being a new sub-sequence from that point.

Figure 6:
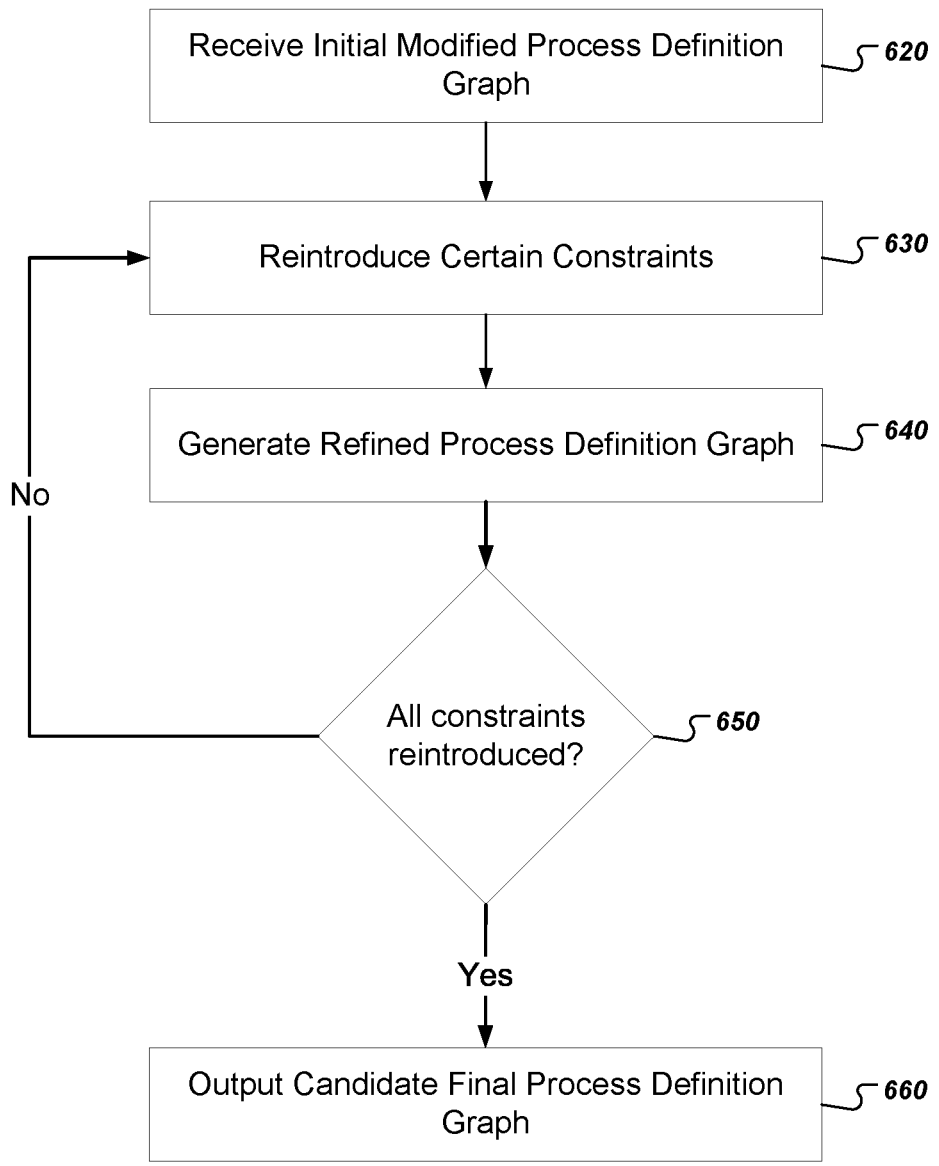
FIG. 6 is a flowchart of an example process for performing deconfliction by iteratively adding constraints and producing refined process definition graphs.

FIG. 6 is a flowchart of an example process for performing deconfliction by iteratively reintroducing constraints and producing refined process definition graphs. The process can be implemented by one or more computer programs installed on one or more computers and programmed in accordance with this specification. For example, the process can be performed by the planner 120 shown in FIG. 1. For convenience, the process will be described as being performed by a system of one or more computers.

The system receives an initial modified process definition graph (step 620). For example, the initial modified process definition graph can be the output of a scheduler, e.g., the scheduling block 250 in FIG. 2. The initial modified process definition graph does not satisfy certain constraints. For example, the graph might satisfy the constraint that no collisions occur between two robots executing tasks, but not satisfy the constraint that no collisions occur between a first robot transitioning between tasks and a second robot executing a task or transitioning between tasks. This constraint relaxation can be represented in the graph by disallowing conflicts between two or more task nodes but allowing conflicts involving transition nodes.

The system reintroduces certain constraints that were ignored when generating the initial modified process definition graph (step 630). For example, the system can now disallow collisions that occur between a first robot performing a task and a second robot transitioning between tasks. The system can continue to ignore some other conflicts, for example conflicts between two robots transitioning between tasks.

The system generates a refined process definition graph (step 640). The system enforces the reintroduced constraints when generating the refined process definition graph. For example, if the system reintroduced the constraint disallowing collisions between a first robot executing a task and a second robot transitioning between tasks, then the refined process definition graph would eliminate conflicts between transition nodes and task nodes. If the system did not reintroduce the constraint disallowing collisions between two robots transitioning between tasks, then the refined process definition graph would ignore conflicts between two or more transition nodes. The system applies transformers on the initial modified process definition graph to generate the refined process definition graph. This process is described in more detail below with reference to FIG. 7.

The system determines if all constraints have been reintroduced (step 650). In some implementations, the system executes a predetermined number of iterations, where a predetermined set of constraints is reintroduced at each respective iteration. In these implementations, the system determines if it has completed the predetermined number of iterations.

If all constraints have been reintroduced, the system outputs the current iteration of the refined process definition graph as a candidate final process definition graph (step 660). For example, the candidate final process definition graph can then be evaluated to see whether it satisfies certain goal criteria (step 280 of FIG. 2).

If all constraints have not been reintroduced, the system performs another iteration of reintroducing constraints and generating a refined process definition graph, returning to step 630. For example, the system can now disallow collisions between two robots transitioning between tasks.

Figure 7:
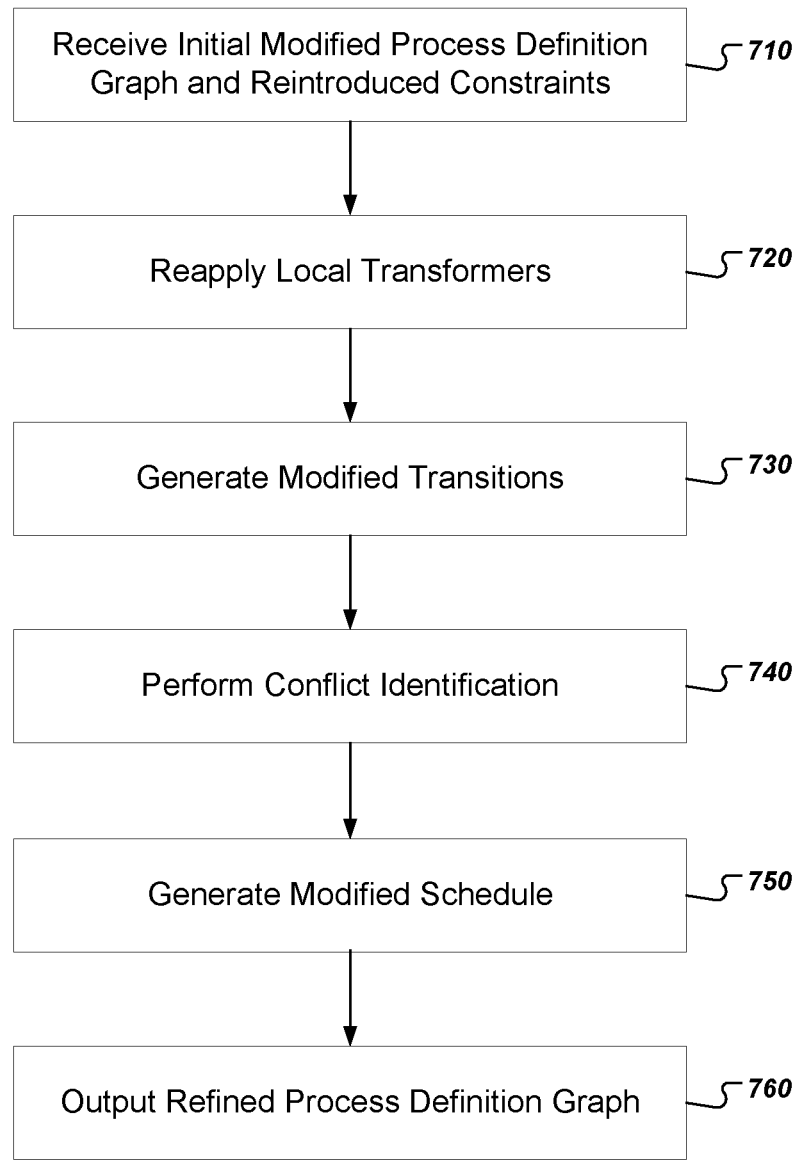
FIG. 7 is a flowchart of an example process for generating a refined process definition graph.

FIG. 7 is a flowchart of an example process for generating a refined process definition graph. The process can be implemented by one or more computer programs installed on one or more computers and programmed in accordance with this specification. For example, the process can be performed by the planner 120 shown in FIG. 1. For convenience, the process will be described as being performed by a system of one or more computers.

The system receives as input an initial modified process definition graph and reintroduced constraints (710). The reintroduced constraints are constraints that are not enforced in the initial modified process definition graph but will be enforced in the generated refined process definition graph.

The system reapplies local transformers (720). As described above, a local transformer is a transformer that does not require reconsideration of all nodes in the graph and which affects only a sufficiently small subset of the graph. Local transformers were applied when generating the initial modified process definition graph, but some or all of the same local transformers may need to be reapplied to generate the refined process definition graph, to ensure that the reintroduced constraints are satisfied. For example, the system might reapply an inverse kinematics (IK) transformer that generates kinematic parameters for a robot to achieve a pose, in order to ensure that the robot does not collide with any other robots when entering the pose. As another example, the system might reapply a local "path planning" transformer that recomputes paths of different nodes in order to obey the reintroduced constraints.

The system generates modified transitions (730). As described above, transitions are actions taken by robots to move from one state to another. Transitions were generated for the initial modified process definition graph, but those transitions might not have satisfied the reintroduced constraints. In some implementations, generating a transition for a first robot to avoid a conflict between the first robot and a second robot includes generating a work volume for the second robot that characterizes the space occupied by the second robot, and generating a transition for the first robot that avoids the work volume. An example of this process is discussed in more detail below in reference to FIG. 8, where the reintroduced constraints disallow conflicts between transition nodes and task nodes. As before, some transformers are designed to generate many alternative options that can all be considered when performing scheduling.

The system performs conflict identification (740). As before, the system identifies actions in the graph that cannot occur at the same time, the same space, or both. The system classifies each conflict either as one that it will strive to avoid during scheduling or as one that it will not strive to avoid during scheduling. The reintroduced constraints, for example, are designated as conflicts that the system will strive to avoid during scheduling.

The system generates a modified schedule (750). As before, in general, the scheduling process solves for underconstrained values in the refined process definition graph until either no more values need to be solved or the system determines that no solution can be found. If the system determines that no solution exists, the system can raise an error. As before, the system can assign tasks to individual robots in the workcell, and can insert rests into the actions and adjust the values of the rests in order to find a scheduling solution.

After the modified schedule is completed, the system outputs the refined process definition graph (760). For example, the refined definition graph can then be evaluated to see whether all constraints have been reintroduced (step 650 of FIG. 6).

Figure 8:
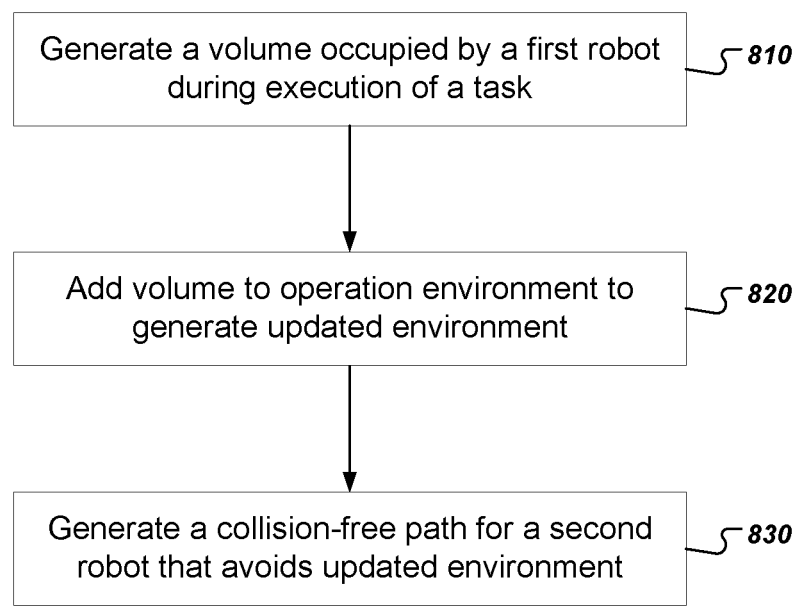
FIG. 8 is a flowchart of an example process for generating modified transitions.

FIG. 8 is a flowchart of an example process for generating modified transitions for a process definition graph that does not allow conflicts between task nodes and transition nodes. The process can be implemented by one or more computer programs installed on one or more computers and programmed in accordance with this specification. For example, the process can be performed by the planner 120 shown in FIG. 1. For convenience, the process will be described as being performed by a system of one or more computers.

The system generates a first volume occupied by a first robot during execution of a task (810). The first volume characterizes the space occupied by the first robot during the execution of the task. The task is represented by a task node in the process definition graph.

The system adds the first volume to an operation environment to generate an updated environment (820). The operation environment characterizes obstacles that should be avoided by robots when executing tasks and moving between tasks. The operation environment can include the physical dimension of the workcell and the dimensions of the robots and other appliances in the workcell. The operation environment can depend on time, e.g. if a robot moves within the workcell, the coordinates of the obstacle representing the robot in the operation environment change over time. By adding the first volume to the operation environment, the system generates an updated environment that includes a further obstacle that should be avoided by other robots during the execution of the task by the first robot.

Having a configurable operation environment that characterizes a particular workcell and configuration of robots and tasks eliminates the need for manually programming a plan for one particular workcell. Generating a plan for a different workcell only requires executing the same process with a different initial operation environment as input. This allows the system to generate a solution optimized for the particular workcell much faster than manual programming.

The system generates a collision-free path for a second robot that avoids the updated environment (830). The path characterizes a transition that avoids a conflict between the first and second robots. The system adds the path as a candidate transition node to the process definition graph. In some implementations, generating the path includes generating a second volume that characterizes the space occupied by the second robot while travelling the path. The path is considered collision-free if the first volume and the second volume do not intersect.

In some implementations, the system aims to avoid the updated environment in generating the path, but allows small conflicts between the updated environment and the path. For example, the system can classify a given conflict as "small" or "not small" when determining whether a path is valid. For example, a conflict can exist if the first volume, characterizing the space occupied by the first robot, and the second volume, characterizing the space occupied by the second robot, intersect. The conflict can be classified as "small" if the volume of the intersection is below a certain threshold, e.g. 100 cm$^3$. If the conflict is classified as "small", the system can allow the conflict.

In some implementations, steps 810 and 820 are executed iteratively for every task node in the graph, so that the updated environment includes volumes for every task in the graph. Then, step 830 is executed iteratively for every transition. Thus, all candidate transition nodes characterize paths that avoid collisions with volumes characterizing all task nodes. In a workcell that includes multiple robots, this means a first path generated for a first robot avoids a first volume occupied by a second robot, and a second path generated for the second robot avoids a second volume occupied by the first robot.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the onsite execution engine 150 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g., a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
    receiving, by the one or more computers, a process definition graph for a robot, the process definition graph having a plurality of action nodes, wherein the action nodes include (1) transition nodes that represent a motion to be taken by the robot from a respective start location to an end location and (2) task nodes that represent a particular task to be performed by the robot at a particular task location, and wherein the process definition graph is associated with constraints that disallow conflicts between work volumes of robots performing action nodes in the process definition graph;
    performing, by the one or more computers, a sequence of modifications to generate, from the process definition graph, a plurality of different final process definition graphs representing candidate plans for controlling multiple robots, including:
        generating, from the process definition graph, an initial modified process definition graph that assigns one or more action nodes to each robot of the multiple robots, including relaxing one or more of the constraints to allow conflicts between pairs of transition nodes and to allow conflicts between transition nodes and task nodes, and
        after generating the initial modified process definition graph, performing a conflict resolution process that reintroduces a constraint that disallows conflicts between transition nodes and task nodes to generate, from the initial modified process definition graph, a refined process definition graph, comprising generating updated paths for one or more transition nodes that avoid volumes occupied by robots performing tasks represented by task nodes in the initial modified process definition graph.

2. The method of claim 1, wherein generating the updated paths for the one or more transition nodes comprises generating a path that keeps the robot outside a volume occupied by a task.

3. The method of claim 1, wherein the initial modified process definition graph specifies paths for respective transition nodes that conflict with volumes occupied by tasks represented by respective task nodes.

4. The method of claim 3, wherein the refined process definition graph specifies paths for transition nodes that are conflicting.

5. The method of claim 3, wherein the refined process definition graph includes no transition nodes having paths that conflict with any volume occupied by any task represented by a task node in the graph.

6. The method of claim 1, wherein the process definition graph has respective action nodes for multiple robots, and wherein generating the refined process definition graph comprises generating alternative plans for the multiple robots.

7. The method of claim 6, wherein generating alternative plans for the multiple robots comprises:
    generating, for a first robot of the multiple robots, a first path that avoids a work volume occupied by a second robot of the multiple robots; and generating, for the second robot of the multiple robots, a second path that avoids a second work volume occupied by the first robot of the multiple robots.

8. The method of claim 1, further comprising generating, from the refined process definition graph, a schedule for the robot that specifies executing motion actions that avoid volumes occupied by tasks represented by task nodes in the graph.

9. A system comprising:
one or more computers and one or more storage devices storing instructions that are operable, when executed by the one or more computers, to cause the one or more computers to perform operations comprising:
receiving, by the one or more computers, a process definition graph for a robot, the process definition graph having a plurality of action nodes, wherein the action nodes include (1) transition nodes that represent a motion to be taken by the robot from a respective start location to an end location and (2) task nodes that represent a particular task to be performed by the robot at a particular task location, and wherein the process definition graph is associated with constraints that disallow conflicts between work volumes of robots performing action nodes in the process definition graph;
performing, by the one or more computers, a sequence of modifications to generate, from the process definition graph, a plurality of different final process definition graphs representing candidate plans for controlling multiple robots, including:
generating, from the process definition graph, an initial modified process definition graph that assigns one or more action nodes to each robot of the multiple robots, including relaxing one or more of the constraints to allow conflicts between pairs of transition nodes and to allow conflicts between transition nodes and task nodes, and
after generating the initial modified process definition graph, performing a conflict resolution process that reintroduces a constraint that disallows conflicts between transition nodes and task nodes to generate, from the initial modified process definition graph, a refined process definition graph, comprising generating updated paths for one or more transition nodes that avoid volumes occupied by robots performing tasks represented by task nodes in the initial modified process definition graph.

10. The system of claim 9, wherein the initial modified process definition graph specifies paths for respective transition nodes that conflict with volumes occupied by tasks represented by respective task nodes.

11. The system of claim 10, wherein the refined process definition graph includes no transition nodes having paths that conflict with any volume occupied by any task represented by a task node in the graph.

12. The system of claim 9, wherein the process definition graph has respective action nodes for multiple robots, and wherein generating the refined process definition graph comprises generating alternative plans for the multiple robots.

13. The system of claim 12, wherein generating alternative plans for the multiple robots comprises:
generating, for a first robot of the multiple robots, a first path that avoids a work volume occupied by a second robot of the multiple robots; and
generating, for the second robot of the multiple robots, a second path that avoids a second work volume occupied by the first robot of the multiple robots.

14. The system of claim 9, wherein the operations further comprise generating, from the refined process definition graph, a schedule for the robot that specifies executing motion actions that avoid volumes occupied by tasks represented by task nodes in the graph.

15. One or more non-transitory computer storage media encoded with computer program instructions that when executed by a one or more computers cause the one or more computers to perform operations comprising:
receiving, by the one or more computers, a process definition graph for a robot, the process definition graph having a plurality of action nodes, wherein the action nodes include (1) transition nodes that represent a motion to be taken by the robot from a respective start location to an end location and (2) task nodes that represent a particular task to be performed by the robot at a particular task location, and wherein the process definition graph is associated with constraints that disallow conflicts between work volumes of robots performing action nodes in the process definition graph;
performing, by the one or more computers, a sequence of modifications to generate, from the process definition graph, a plurality of different final process definition graphs representing candidate plans for controlling multiple robots, including:
generating, from the process definition graph, an initial modified process definition graph that assigns one or more action nodes to each robot of the multiple robots, including relaxing one or more of the constraints to allow conflicts between pairs of transition nodes and to allow conflicts between transition nodes and task nodes, and
after generating the initial modified process definition graph, performing a conflict resolution process that reintroduces a constraint that disallows conflicts between transition nodes and task nodes to generate, from the initial modified process definition graph, a refined process definition graph, comprising generating updated paths for one or more transition nodes that avoid volumes occupied by robots performing tasks represented by task nodes in the initial modified process definition graph.

16. The non-transitory computer storage media of claim 15, wherein the initial modified process definition graph specifies paths for respective transition nodes that conflict with volumes occupied by tasks represented by respective task nodes.

17. The non-transitory computer storage media of claim 16, wherein the refined process definition graph includes no transition nodes having paths that conflict with any volume occupied by any task represented by a task node in the graph.

18. The non-transitory computer storage media of claim 15, wherein the process definition graph has respective action nodes for multiple robots, and wherein generating the refined process definition graph comprises generating alternative plans for the multiple robots.

19. The non-transitory computer storage media of claim 18, wherein generating alternative plans for the multiple robots comprises:
generating, for a first robot of the multiple robots, a first path that avoids a work volume occupied by a second robot of the multiple robots; and generating, for the second robot of the multiple robots, a second path that avoids a second work volume occupied by the first robot of the multiple robots.

20. The non-transitory computer storage media of claim 15, wherein the operations further comprise generating, from the refined process definition graph, a schedule for the robot that specifies executing motion actions that avoid volumes occupied by tasks represented by task nodes in the graph.

* * * * *